US008952637B2

(12) United States Patent
Suzuki

(10) Patent No.: US 8,952,637 B2
(45) Date of Patent: Feb. 10, 2015

(54) CONTROL DEVICE FOR THREE-PHASE ROTATING MACHINE

(71) Applicant: Denso Corporation, Kariya, Aichi-pref. (JP)

(72) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 13/869,452

(22) Filed: Apr. 24, 2013

(65) Prior Publication Data

US 2013/0285591 A1   Oct. 31, 2013

(30) Foreign Application Priority Data

Apr. 26, 2012   (JP) .................................. 2012-100855

(51) Int. Cl.
*H02P 6/00*   (2006.01)
*H02P 25/22*   (2006.01)

(52) U.S. Cl.
CPC ..................................... *H02P 25/22* (2013.01)
USPC ............. 318/400.01; 318/400.02; 318/400.27; 318/811

(58) Field of Classification Search
USPC ......... 318/807, 808, 800, 432, 798, 799, 433, 318/767, 778, 812, 63, 400.01, 400.02, 318/400.32, 400.25, 400.27, 400.28, 811
See application file for complete search history.

(56) References Cited

U.S. PATENT DOCUMENTS

| 4,814,964 | A | 3/1989 | Schauder et al. |
| 6,107,774 | A * | 8/2000 | Yamada et al. ............... 318/807 |
| 8,604,730 | B2 * | 12/2013 | Suzuki ..................... 318/400.02 |
| 2003/0085683 | A1 * | 5/2003 | Satake et al. .................. 318/727 |
| 2008/0258656 | A1 * | 10/2008 | Kawasaki et al. ............. 318/148 |
| 2011/0156626 | A1 * | 6/2011 | Mukai et al. ............. 318/400.21 |
| 2011/0156627 | A1 * | 6/2011 | Nakamura et al. ........ 318/400.22 |
| 2011/0156629 | A1 * | 6/2011 | Satou et al. .................... 318/453 |

FOREIGN PATENT DOCUMENTS

| JP | 2614788 | 2/1997 |
| JP | 2007-152994 | 6/2007 |
| JP | 2011-152027 | 8/2011 |

* cited by examiner

*Primary Examiner* — Eduardo Colon Santana
*Assistant Examiner* — Bickey Dhakal
(74) *Attorney, Agent, or Firm* — Nixon & Vanderhye PC

(57) ABSTRACT

In a control device for a three-phase rotating machine with first and second winding sets, a current feedback computing section includes a current sum controller and a current difference controller. The current sum controller multiplies, by a sum gain, an error between a sum of current command values for alternating currents output from first and second inverters and a sum of sensed current values and computes a sum of voltage command values. The current difference controller multiplies, by a difference gain, an error between a difference of the current command values and a difference between the sensed current values, and computes a difference of voltage command values. In a variable-responsiveness mode, a gain ratio between the sum gain and the difference gain is varied according to a reference frequency such that the current sum controller and the current different controller are different in responsiveness.

8 Claims, 16 Drawing Sheets

V-sum ($V_1+V_2$) → [ $\frac{1}{R+(L+M)s}$ ] → I-sum ($I_1+I_2$)

V-diff ($V_1-V_2$) → [ $\frac{1}{R+(L-M)s}$ ] → I-sum ($I_1-I_2$)

CONTROL DEVICE FOR THREE-PHASE ROTATING MACHINE

CROSS REFERENCE TO RELATED APPLICATION

This application is based on Japanese Patent Application No. 2012-100855 filed on Apr. 26, 2012, the disclosure of which is incorporated herein by reference.

TECHNICAL FIELD

The present disclosure relates to a control device for a three-phase rotating machine.

BACKGROUND

A known control device for controlling the drive of a three-phase rotating machine having two three-phase winding sets includes a power converter for one unit and a power converter for another unit. Each of the power converters is associated with corresponding one of the winding sets.

For example, Patent Document 1 (JP-A-2011-152027) discloses a control device including a power converter in one unit and a power converter in another unit. Each of the power converters supplies current to corresponding one of the two winding sets of a three-phase motor. The control device performs the feedback control of the sum of the currents supplied from the two power converters to the corresponding two winding sets.

A control device may control only the sum of the currents output from the two power converters. In this case, if the two units are different in resistance, a current difference arises between the two units. The current difference is likely to cause torque ripples and worsen the heat characteristic, particularly, during low speed rotation. Also, if one of the units is accidentally opened, no current flows in the one and an excessive current equivalent to twice the normal current flows in the other which is in normal.

SUMMARY

It is an object of the present disclosure to provide a control device for a three-phase rotating machine, which is capable of reducing the torque ripples and improving the heat characteristic.

According to an aspect of the present disclosure, a control device is for a three-phase rotating machine having a first three-phase winding set and a second three-phase winding set that are coupled magnetically to each other. The control device includes a first power converter, a second power converter, a first current sensing section, a second current sensing section, and a current feedback computing section including a current sum controller and a current difference controller.

The first power converter outputs a first alternating current to the first three-phase winding set. The second power converter outputs a second alternating current to the second three-phase winding set. The control device controls the sum of and the difference between the alternating currents, which differ in phase by an angle of $30°±60°×n$ from each other in which n is an integer.

The first current sensing section senses the first alternating current and outputs a first sensed current value. The second current sensing section senses the second alternating current and outputs a second sensed current value.

The current sum controller multiplies a sum error by a sum gain and computes the sum of a first voltage command value for the first power converter and a second voltage command value for the second power converter. The sum error is an error between the sum of the sensed current values and the sum of a first current command value for the first alternating current and a second current command value for the second alternating current.

The current difference controller multiplies a difference error by a difference gain and computes the difference between the first and second voltage command values. The difference error is an error between the difference between the sensed current values and the difference between the current command values.

The current feedback computing section performs a feedback control in a variable-responsiveness mode in which the gain ratio between the sum gain and the difference gain is varied such that the current sum controller and the current difference controller are different in responsiveness according to a reference frequency, which is the frequency of the first and second alternating currents.

While being supplied with power, the first and second three-phase winding sets are coupled magnetically to each other, producing a mutual inductance. In consideration of the influence of the mutual inductance, for example, the current sum controller may compute the sum of the first and second current command values based on an inverse model of the three-phase rotating machine, and that the current difference controller may compute the difference between the first and second current command values based on the model.

For example, such a control device provides the following advantages.

(1) The control device controls the current sum and the current difference for the two power converters. Since the current difference between the two units is converged into 0. Torque ripples are reduced and a heat characteristic is improved. By suitably setting the sum gain and the difference gain, the control device restricts overcurrent in one of the units if the other fails and no current flows in the other.

(2) If a superimposed wave consisting of a fundamental wave and the fifth higher harmonic superimposed on the fundamental wave is dq-converted, the fifth component becomes the sixth strain component. In contrast, the phase shift of $(30±60×n)°$ between the alternating currents in the two units cancels the sixth strain component in electrical angle in the control of the current sum.

(3) In the control of the sum of and the difference between the currents in the two units, if the induced voltage increases while the three-phase rotating machine is rotating at a high speed, the current strain increases. The strain may cause sounds and/or vibrations while the machine is rotating at a high speed. Therefore, by so varying the gain ratio as to make the current sum controller and the current difference controller different in responsiveness from each other according to the reference frequency fr, which is proportional to the speed of the machine, it is possible to suppress the influence of the current strain, thereby reducing the sounds and/or vibrations while the machine is rotating at a high speed.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Embodiments of the present disclosure will be described below with reference to the accompanying drawings. In the embodiments, a control device according to the present disclosure is applied to a three-phase motor of an electric steering apparatus of a vehicle.

First Embodiment

A first embodiment of the present disclosure will be described with reference to FIGS. 1-16.

[Structure of Control device for Three-phase Rotating Machine]

Figure 2:
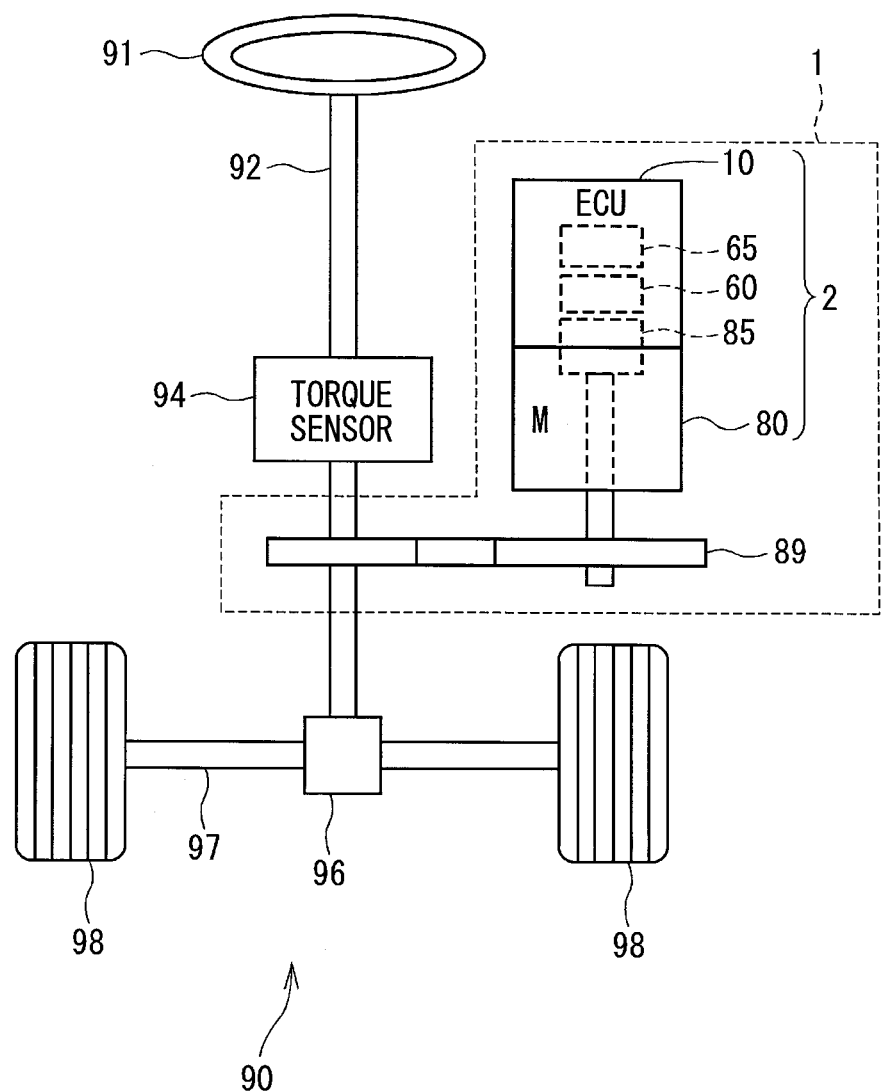
FIG. 2 is a schematic diagram of an electric steering apparatus to which the control device is applied.

FIG. 2 shows the whole structure of a steering system 90 including an electric steering apparatus 1. A steering wheel 91 is fixed to the top of a steering shaft 92, which is provided with a torque sensor 94 for sensing the steering torque of the shaft. The bottom of the steering shaft 92 has a pinion 96, which is in mesh with a rack 97. A pair of wheels 98 is connected rotatably to both ends of the rack 97 by tie rods etc. The pinion 96 converts a rotational motion of the steering shaft 92 into a linear motion of the rack 97. The steering apparatus 1 steers the pair of wheels 98 for an angle according to a linear displacement of the rack 97.

The steering apparatus 1 includes an actuator 2 and speed reducing gears 89. The actuator 2 rotates a rotating shaft. The gears 89 reduce the rotation of the rotating shaft and transmit the reduced rotation to the steering shaft 92.

The actuator 2 includes a three-phase brushless motor 80 as a three-phase rotating machine and an ECU 10 as a control device. The motor 80 generates steering assist torque to rotate the speed reducing gears 89 in both directions. The ECU 10 drives the motor 80.

The ECU 10 includes a controller 65 and an inverter 60 as a power converter, which controls the power supply to the motor 80 in accordance with commands from the controller 65. A rotation angle sensor 85 senses the rotation angle of the motor 80. The sensor 85 may include a magnet as a magnetism generating section disposed in the motor 80 and a magnetism sensing element disposed in the ECU 10.

The controller 65 controls the output to the inverter 60 based on a steering torque signal from the torque sensor 94, a rotation angle signal from the rotation angle sensor 85, and the like. With this control, the actuator 2 generates steering assist torque for assisting the steering wheel 91 to be turned. Also, the actuator 2 transmits the generated torque to the steering shaft 92.

Figure 1:
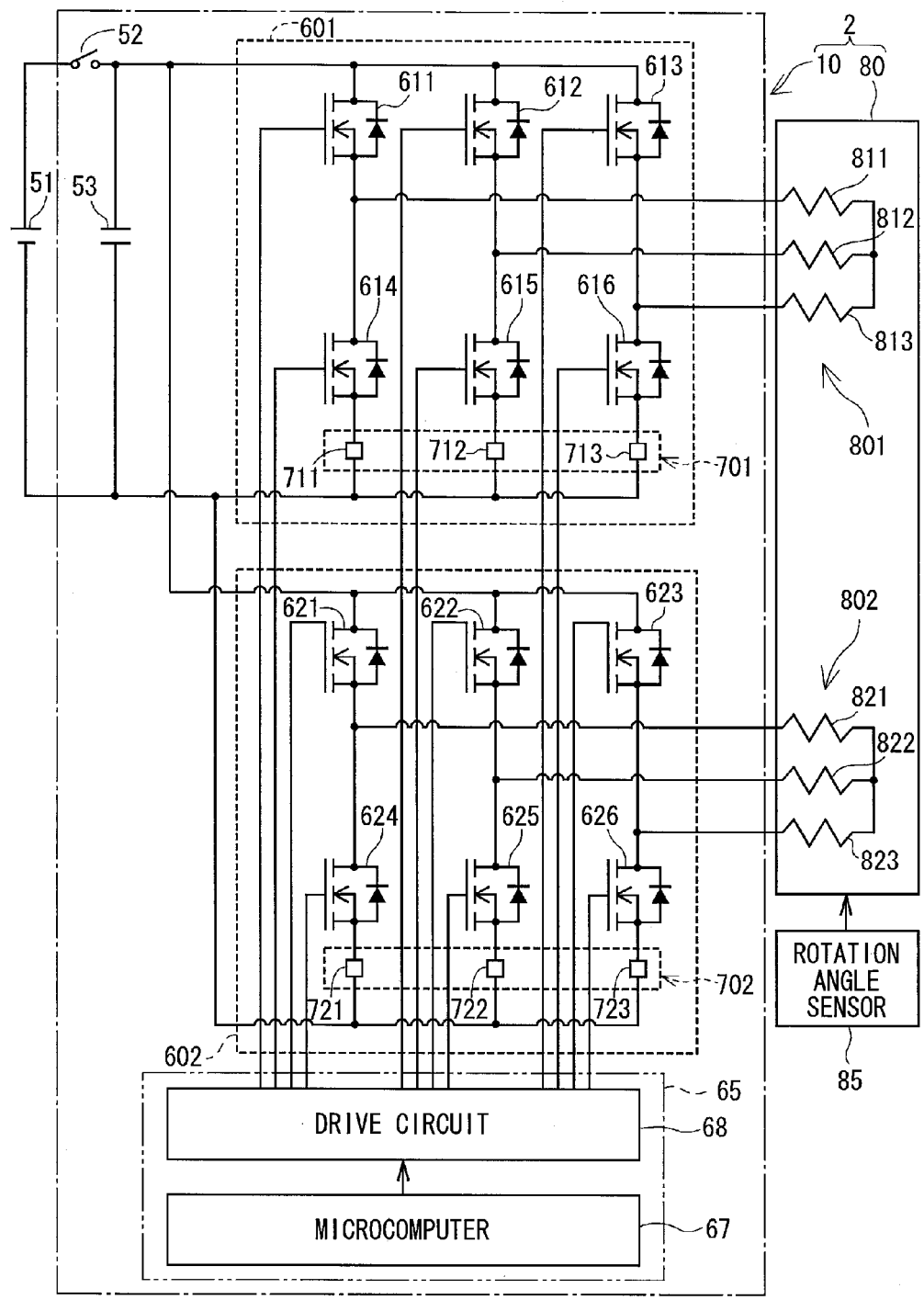
FIG. 1 is a circuit diagram of a control device for a three-phase rotating machine according to a first embodiment of the present disclosure.

In more detail, as shown in FIG. 1, the motor 80 includes a first three-phase winding set 801 and a second three-phase winding set 802.

The first three-phase winding set 801 includes a U-phase winding 811, a V-phase winding 812, and a W-phase winding 813. The second three-phase winding set 802 includes a U-phase winding 821, a V-phase winding 822, and a W-phase winding 823. The winding sets 801 and 802 are not coupled electrically to each other but coupled magnetically to each other by the magnetic circuit created by the motor 80. The magnetic coupling of the winding sets 801 and 802 will be described later in detail.

The inverter 60 includes a first inverter 601 and a second inverter 602, which are associated with the winding sets 801 and 802 respectively. Hereinafter, the combination of each inverter 601 or 602 and the associated winding set 801 or 802 will be referred to as "unit". For example, the combination of the first inverter 601 and the first three-phase winding set 801 provides a first unit, and the combination of the second inverter 602 and the second three-phase winding set 802 provides a second unit.

The ECU 10 further includes a power supply relay 52, a capacitor 53, a first current sensor 701, and a second current sensor 702. The first and second sensors 701 and 702 correspond to first and second current sensing sections. The first current sensor 701 includes current sensing elements 711-713. The elements 711-713 respectively sense the phase currents supplied from the first inverter 601 to the windings 811-813 of the first three-phase winding set 801. The second current sensor 702 includes current sensing elements 721-723. The elements 721-723 respectively sense the phase currents supplied from the second inverter 602 to the windings 821-823 of the second three-phase winding set 802.

A battery 51 may be a 12 volt DC power supply. The power supply relay 52 can cut off the power supply from the battery 51 to the inverters 601 and 602.

The capacitor 53 is connected in parallel with the battery 51. The capacitor 53 accumulates electric charge, assists the power supply to the inverters 601 and 602, and suppresses noise content such as surge current.

The first inverter 601 includes six switching elements 611-616 connected in a bridge circuit to switch the power supply to the windings 811-813 of the first three-phase winding set 801. The switching elements 611-616 are MOSFETs (metal oxide semiconductor field-effect transistors).

The drains of the high-potential MOSFETs 611-613 are connected to the positive electrode of the battery 51 via the power supply relay 52. The sources of the high-potential MOSFETs 611-613 are connected to the drains of the low-potential MOSFETs 614-616, respectively. The sources of the low-potential MOSFETs 614-616 are connected to the negative electrode of the battery 51 via the current sensing elements 711-713, respectively.

One end of the U-phase winding 811 is connected to a connecting point between the source of the high-potential MOSFET 611 and the drain of the low-potential MOSFET 614. One end of the V-phase winding 812 is connected to a connecting point between the source of the high-potential MOSFET 612 and the drain of the low-potential MOSFET 615. One end of the W-phase winding 813 is connected to a connecting point between the source of the high-potential MOSFET 613 and the drain of the low-potential MOSFET 616.

The second inverter 602 includes six switching elements (MOSFETs) 621-626, which are identical in configuration with the switching elements 611-616 of the first inverter 601. The current sensing elements 721-723 of the second current sensor 702 are identical in configuration with the current sensing elements 711-713 of the first current sensor 701.

The controller 65 includes a microcomputer 67 and a drive circuit (pre-driver) 68. The microcomputer 67 controls and computes various control values based on input signals such as the steering torque signal and the rotation angle signal. The drive circuit 68 is connected to the gates of the MOSFETs 611-616 and 621-626 and switches the gates based on the control by the microcomputer 67.

Figure 3A:
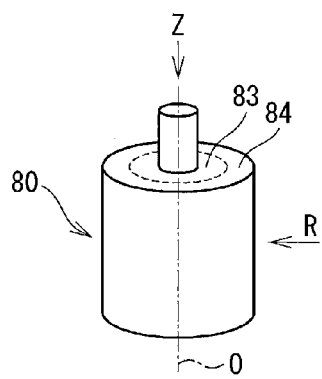
FIG. 3A is a side view of a three-phase rotating machine controlled by the control device according to the first embodiment.
Figure 3B:
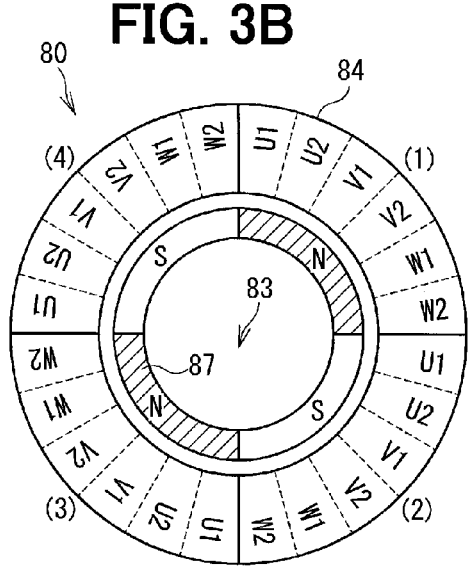
FIG. 3B is a schematic diagram of the three-phase rotating machine when viewed along an arrow Z in FIG. 3A.

The structure of the motor 80 will be described in more detail with reference to FIGS. 3A-3C. As shown in FIG. 3A, the motor 80 includes a stator 84 and a rotor 83, which rotates relative to the stator about an axis O. As shown in FIG. 3B, the rotor 83 includes permanent magnets 87.

The three-phase brushless motor 80 is characterized in that the number of coils of the stator 84 is 12×m (a natural number), and that the number of poles of the permanent magnets 87 is 2×m. FIGS. 3A-3C show an example in which the number m is 2. The number m might be another natural number than 2.

FIG. 3B shows the permanent magnets 87 and stator 84 as viewed in a thrust direction Z of FIG. 3A. The four (=2×2) permanent magnets 87 are arranged with their N-poles and S-poles alternated. The stator 84 includes twenty-four (12×2) stator coils. The twenty-four stator coils are grouped into four coil groups, each coil group including six coils, which are U1, U2, V1, V2, W1 and W2 coils. The U1, U2, V1, V2, W1, and W2 coils are arranged in that order clockwise in FIG. 3B. Each of the winding sets 801 and 802 consists of two of the coil groups.

Figure 3C:
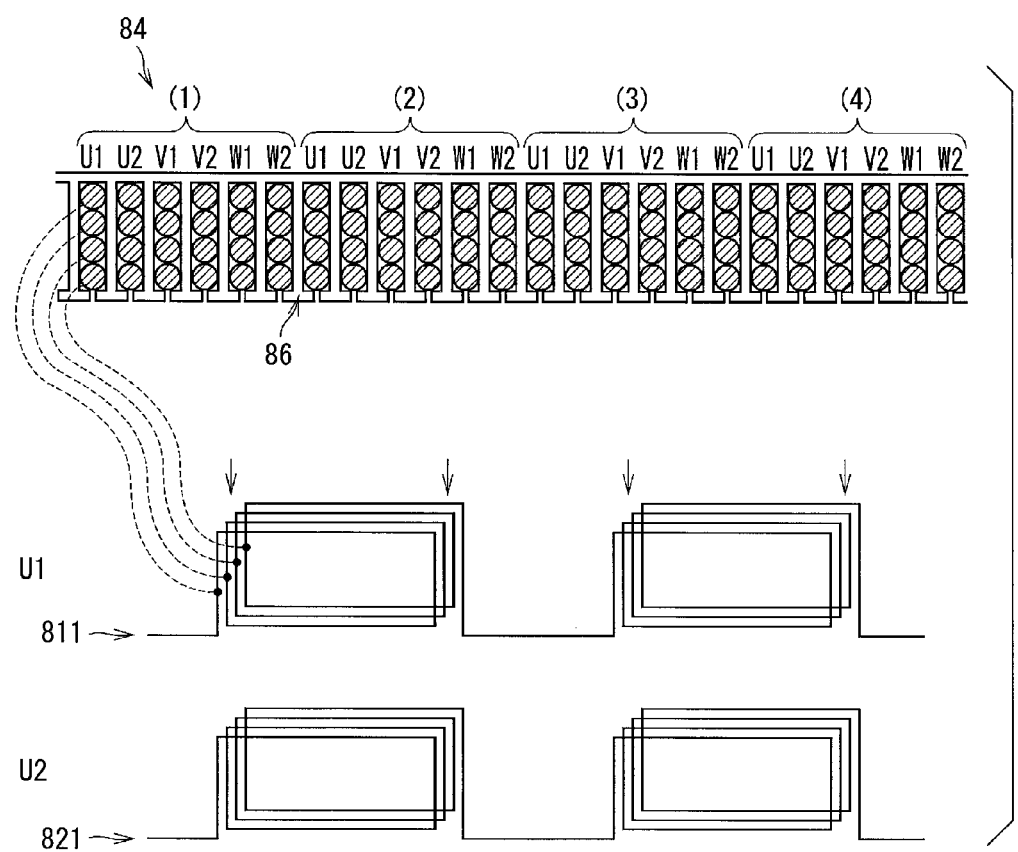
FIG. 3C is a schematic exploded view of a stator of the three-phase rotating machine when viewed along the arrow Z in FIG. 3A with explanatory views of windings.

In FIG. 3C, a top view is a development of the stator 84 as viewed in the thrust direction Z, and middle and bottom views are developments of the windings 811 and 821 as viewed in a radial direction R of FIG. 3A. For example, with reference to FIG. 3C, a winding that provides the U1 coils is a wire wound in order around every sixth protrusion 86 and the next sixth protrusion 86.

Consequently, for the U-phase as an example, the U2 coil 821 of the second winding set 802 is positioned circumferentially ahead of the U1 coil 811 of the first winding set 801 by the angle equivalent to an electrical angle of 30°. Accordingly, the three-phase currents supplied to the second winding set 802 can be 30° ahead in phase of the three-phase currents supplied to the first winding set 801.

Figure 4:
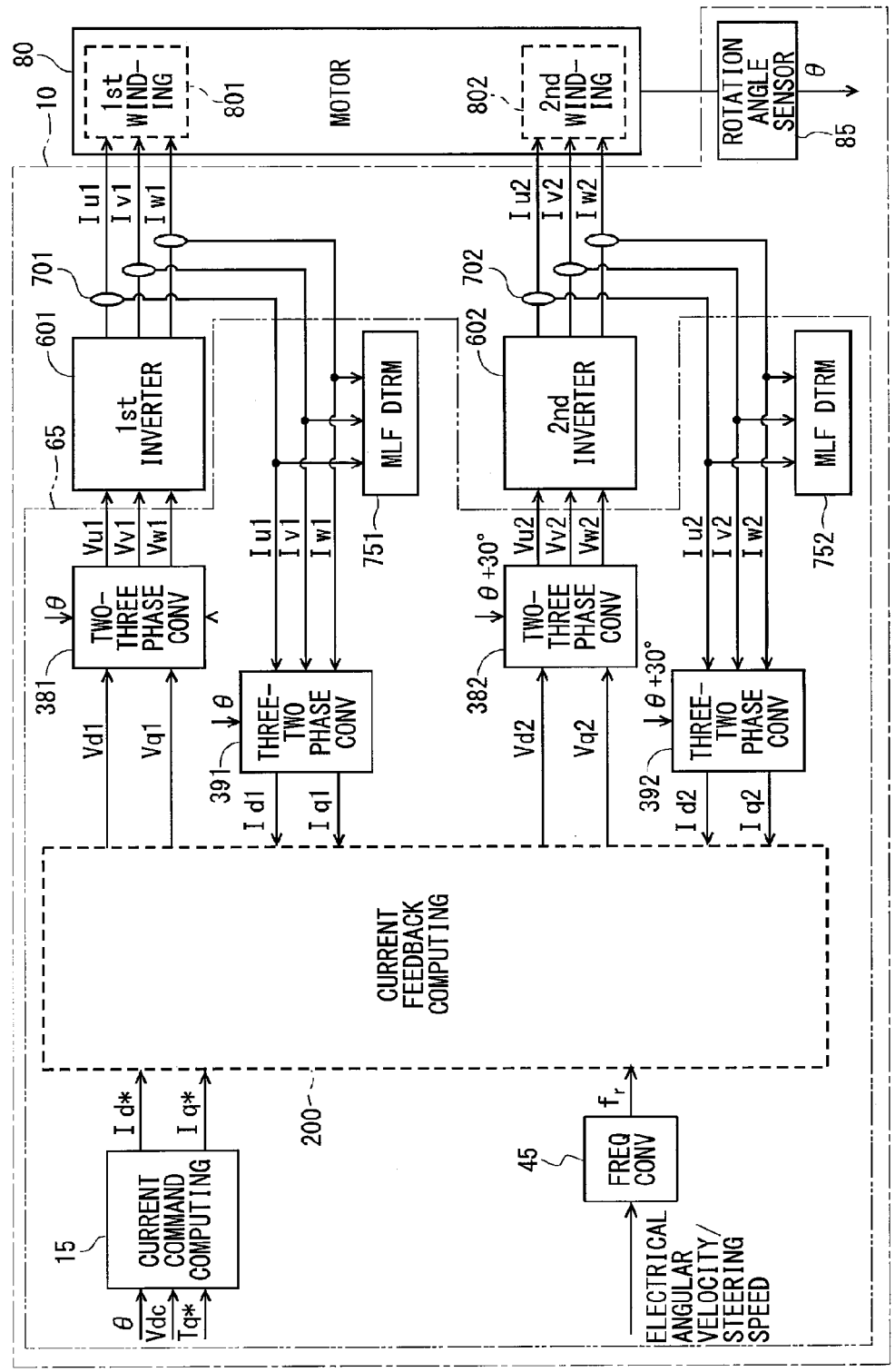
FIG. 4 is a block diagram of the control device according to the first embodiment.

FIG. 4 is a control block diagram of the ECU 10.

As shown with two-dot chain lines in FIG. 4, the controller 65 includes a current command value computing section 15, a current feedback computing section 200, a first two-three phase converter 381, a second two-three phase converter 382, a first three-two phase converter 391, a second three-two phase converter 392, a first malfunction determining section 751, and a second malfunction determining section 752.

The current command value computing section 15 receives a signal output from the rotation angle sensor 85 and representing the rotation angle θ of the motor 80, a signal output from a vehicle speed sensor and representing the vehicle speed Vdc of the vehicle, and a signal output from the torque sensor 94 and representing the steering torque Tq* of the steering shaft 92. Based on these signals, the computing section 15 outputs a d-axis current command value Id* for the d-axis currents and a q-axis current command value Iq* for the q-axis currents. The d-axis currents are parallel to the magnetic fluxes of the motor 80. The q-axis currents are perpendicular to the d-axis.

The current feedback computing section 200 is shown as a block surrounded by broken lines in FIG. 4. Only the inputs to and the outputs from the block will be described briefly below. The structure of the computing section 200 will be described later in detail. The current feedback computing section 200 receives the current command values Id* and Iq* from the current command value computing section 15. The current feedback computing section 200 also receives the sensed current values Id1 and Iq1 converted by the first three-two phase converter 391 and the sensed current values Id2 and Iq2 converted by the second three-two phase converter 392. The current feedback computing section 200 outputs two-phase voltage command values Vd1 and Vq1 to the first two-three phase converter 381, and also outputs two-phase voltage command values Vd2 and Vq2 to the second two-three phase converter 382.

Based on the rotation angle θ fed back from the rotation angle sensor 85, the first two-three phase converter 381 converts the two-phase voltage command values Vd1 and Vq1 into a U-phase voltage command value Vu1, a V-phase voltage command value Vv1, and a W-phase voltage command value Vw1. The converter 381 then outputs the command values Vu1, Vv1 and Vw1 to the first inverter 601.

Based on a rotation angle (θ+30°), the second two-three phase converter 382 converts the two-phase voltage command values Vd2 and Vq2 into a U-phase voltage command value Vu2, a V-phase voltage command value Vv2, and a W-phase voltage command value Vw2. The converter 382 then outputs the command values Vu2, Vv2 and Vw2 to the second inverter 602.

The first current sensor 701 senses a U-phase current value Iu1, a V-phase current value Iv1, and a W-phase current value Iw1 output from the first inverter 601. Based on the rotation angle θ fed back from the rotation angle sensor 85, the first three-two phase converter 391 converts the sensed phase current values Iu1, Iv1 and Iw1 into the sensed d-axis current value Id1 and the sensed q-axis current value Iq1.

The second current sensor 702 senses a U-phase current value Iu2, a V-phase current value Iv2, and a W-phase current value Iw2 output from the second inverter 602. Based on the rotation angle (θ+30°), the second three-two phase converter 392 converts the sensed phase current values Iu2, Iv2 and Iw2 into the sensed d-axis current value Id2 and the sensed q-axis current value Iq2.

The first malfunction determining section 751 determines whether the sensed phase current values Iu1, Iv1 and Iw1 are within the normal range between a lower limit value and an upper limit value. The second malfunction determining section 752 determines whether the sensed phase current values Iu2, Iv2 and Iw2 are within the normal range.

Figure 5:
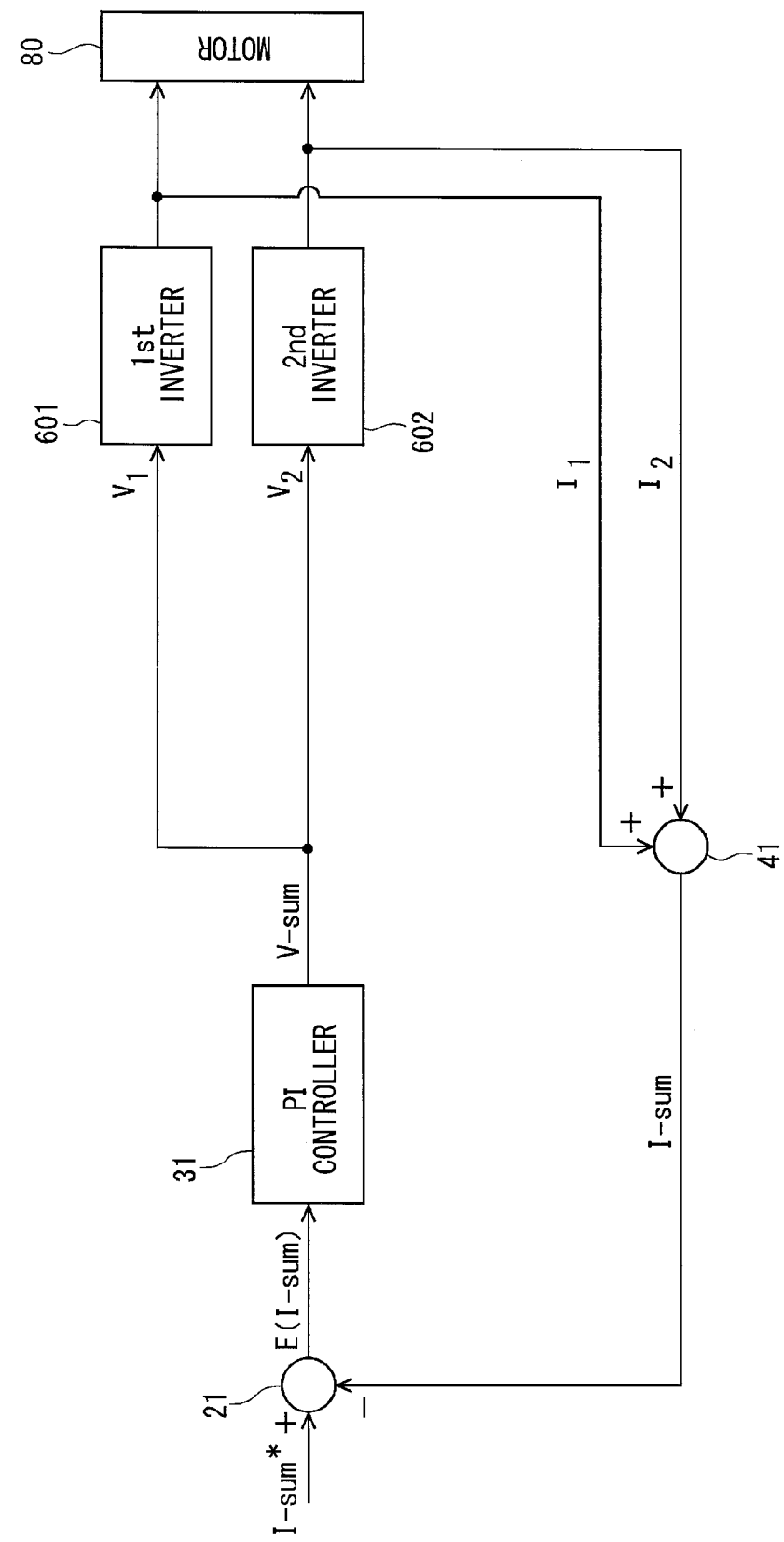
FIG. 5 is a block diagram for the explanation of current sum control as a comparative example to the first embodiment.

Current feedback control configurations will be described below with reference to FIGS. 5 and 6, in which the currents and the voltages are not decomposed into d-axis and q-axis vectors, but represented in scalar so that the description of features of the current feedback control in the present embodiment can be simplified.

The current feedback control configuration of an example comparative with the present embodiment will be described below with reference to FIG. 5. This configuration controls the sum of the currents in the first unit and the second unit. A current adder 41 adds a sensed value I1 of the current output from the inverter 601 of the first unit and a sensed value I2 of the current output from the inverter 602 of the second unit. The current adder 41 then outputs the sum I-sum of the sensed current values I1 and I2.

A current sum error calculator 21 calculates the error E(I-sum) between the sum I-sum and the sum I-sum* of the current command values in the first and second units. The calculator 21 then outputs the error E(I-sum) to a PI controller 31. The PI controller 31 so computes the sum V-sum of the voltage command values in the first and second units by means of proportional-plus-integral control operation as to converge the error E(I-sum) into 0.

The current feedback control configuration of the present embodiment will be described below with reference to FIG. 6, in which the block surrounded by broken lines corresponds to the current feedback computing section 200 of FIG. 4. As shown in FIG. 6, the ECU 10 controls the sum of the currents in the first and second units, and the difference between the currents in the first and second units. Specifically, the ECU 10 has both a configuration for controlling the current sum and a configuration for controlling the current difference, which will be explained below. Herein, a "difference" in current or voltage between the two units means a value for the first unit from which a value for the second unit is subtracted.

A current subtracter 42 subtracts, from a sensed value I1 of the current output from the first inverter 601, a sensed value I2 of the current output from the second inverter 602. The subtracter 42 then outputs the difference I-difference between the sensed current values I1 and I2.

A current difference error calculator 22 calculates the error E(I-difference) between the difference I-difference and the difference I-difference* between the current command values in the two units. The calculator 22 then outputs the error E(I-difference) to a PI controller 32. The controller 32 so computes the difference V-difference between the voltage command values in the two units by means of proportional-plus-integral control operation as to converge the error E(I-difference) into 0.

A calculator 371 computes a first voltage command value V1 from the sum V-sum and the difference V-difference. A calculator 372 computes a second voltage command value V2 from the sum V-sum and the difference V-difference.

Because the electrical characteristics of the inverters 601 and 602 are equivalent, the difference I-difference* between the current command values in the two units is 0 in principle.

The PI controllers 31 and 32 correspond to the current sum controller and the current difference controller respectively. The controller 31 multiplies the error E(I-sum) by a sum gain K-sum. The controller 32 multiplies the error E(I-difference) by a difference gain K-difference. The ratio (K-difference/K-sum) of the difference gain K-difference to the sum gain K-sum will be referred to as "the difference/sum gain ratio".

A frequency converter 45 converts the electrical angular velocity of the motor 80 or the steering speed of the steering shaft 92 into a reference frequency fr and outputs the reference frequency fr to the PI controllers 31 and 32. The controllers 31 and 32 make their responsiveness different from each other by varying the difference/sum gain ratio according to the frequency fr. This will be explained later in detail. The frequency converter 45 corresponds to a frequency calculating section.

[Influence of Mutual Inductance]

As stated already, the winding sets 801 and 802 are coupled magnetically to each other. Consequently, the currents through each of the winding sets 801 and 802 are influenced by not only its self-inductance but also the mutual inductance between the sets. The influence of the mutual inductance will be explained below with reference to FIGS. 7-12. First, a description will be provided for a dq-axis model as operating when the electrical angular velocity ω of a three-phase motor is 0 in the rotating coordinate system of the motor 80. Next, a brief description will be provided for a general dq-axis model as operating when the electrical angular velocity ω of a three-phase motor is not 0 in the rotating coordinate system of the motor 80.

Figure 7:
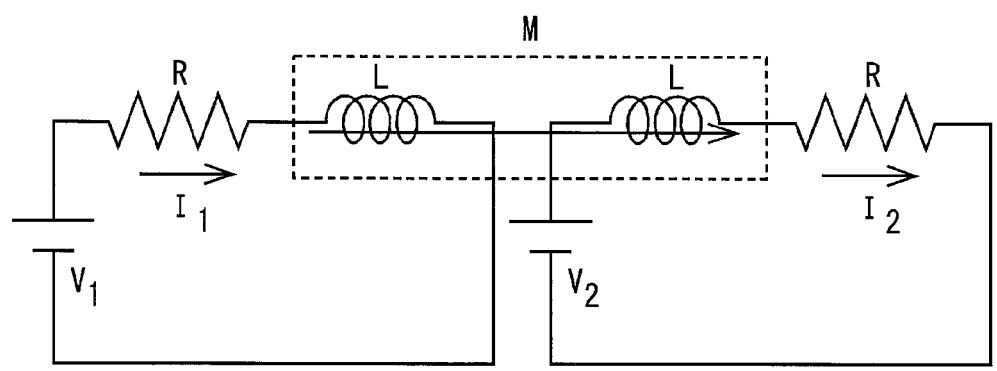
FIG. 7 is a circuit diagram for the explanation of the influence of mutual inductance.

FIG. 7 shows an assumed circuit of the first unit (e.g., left unit) and an assumed circuit of the second unit (e.g., right unit). Each of these circuits includes a resistor and a coil, which are connected in series. The resistances R of the two resistors are equal. The self-inductances L of the two coils are equal. The magnetic fields created by the two coils interfere with each other, causing a mutual inductance M.

Voltages V1 and V2 are applied in the circuits of the first and second units respectively. Currents I1 and I2 flow in the circuits of the first and second units respectively. The voltages V1 and V2 can be expressed as Expressions 1.1 and 1.2 respectively with a Laplace variable s.

$$V1 = R \times I1 + L \times I1 s + M \times I2 s \qquad \text{(Ex. 1.1)}$$

$$V2 = R \times I2 + L \times I2 s + M \times I1 s \qquad \text{(Ex. 1.2)}$$

Figures 8A, 8B, 8C:
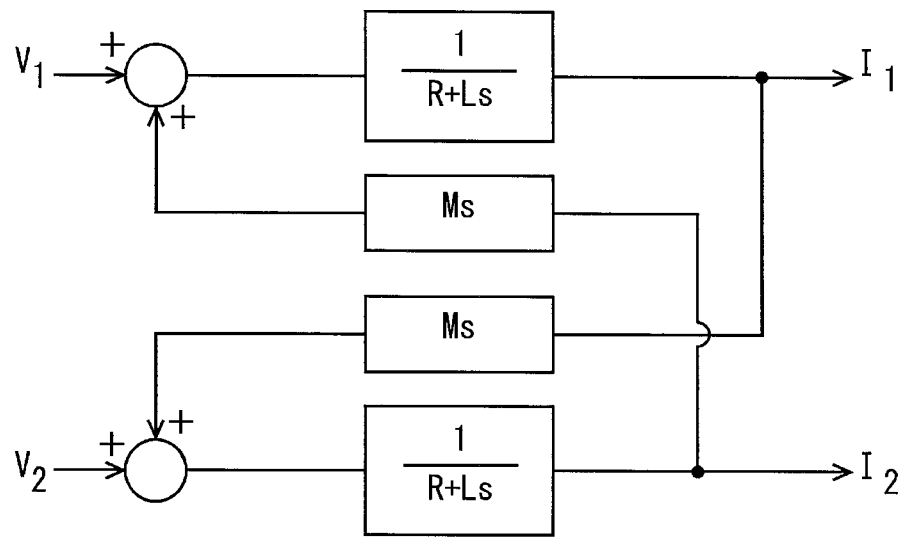
FIGS. 8A-8C are block diagrams for the explanation of consideration of the influence of mutual inductance.

That is to say, the third term of Expression 1.1 or 1.2 for each of the two circuits includes the product of the mutual inductance and the current in the other circuit. FIG. 8A shows Expressions 1.1 and 1.2 as a block diagram.

The calculation of the sum of Expressions 1.1 and 1.2 leads to Expression 1.3.

$$V1 + V2 = R \times (I1 + I2) + L \times (I1 + I2)s + M \times (I1 + I2)s$$

$$I1 + I2 = (V1 + V2) \times [1/\{R + (L+M)s\}] \qquad \text{(Ex. 1.3)}$$

The calculation of the result produced with Expression 1.2 subtracted from Expression 1.1 leads to Expression 1.4.

$$V1-V2 = R \times (I1-I2) + L \times (I1-I2)s - M \times (I1-I2)s$$

$$I1-I2 = (V1-V2) \times [1/\{R+(L-M)s\}] \quad \text{(Ex. 1.4)}$$

FIGS. 8B and 8C show Expressions 1.3 and 1.4 respectively as block diagrams.

Hereinafter, (V1+V2), (I1+I2), (V1−V2), and (I1−I2) will be denoted by V-sum, I-sum, V-difference, and I-difference respectively.

Figure 9A:
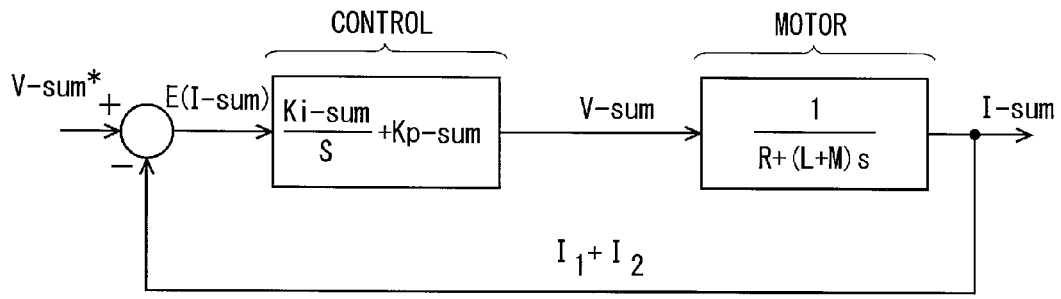
FIGS. 9A-9C are block diagrams for the explanation of current sum control including mutual inductance.
Figure 9B:
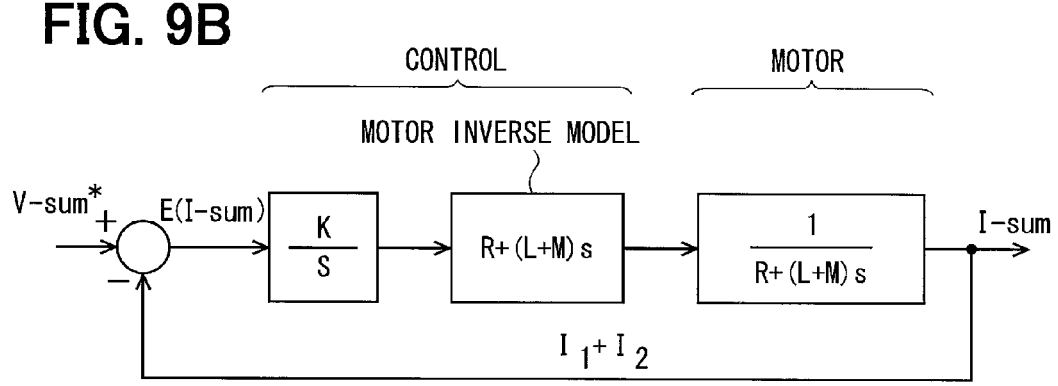
Figure 9C:
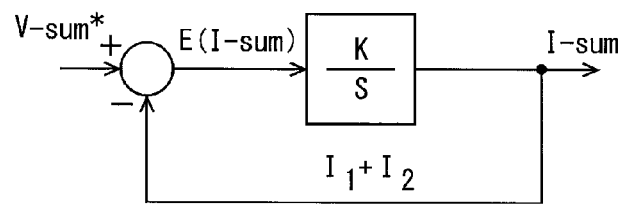
Figure 10A:
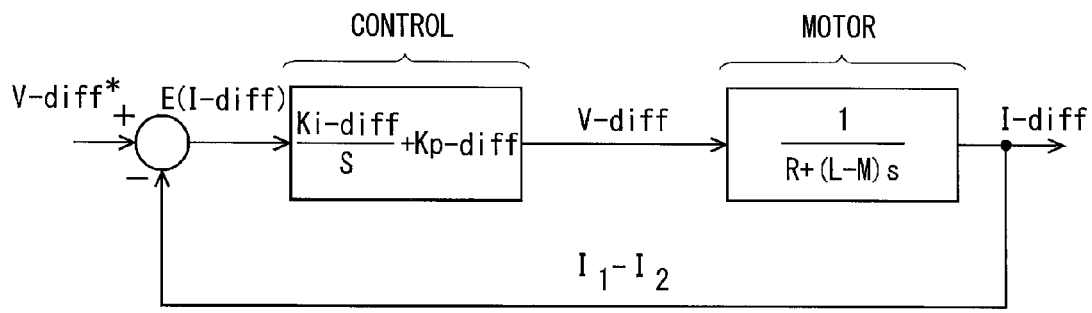
FIGS. 10A-10C are block diagrams for the explanation of current difference control including mutual inductance.
Figure 10B:
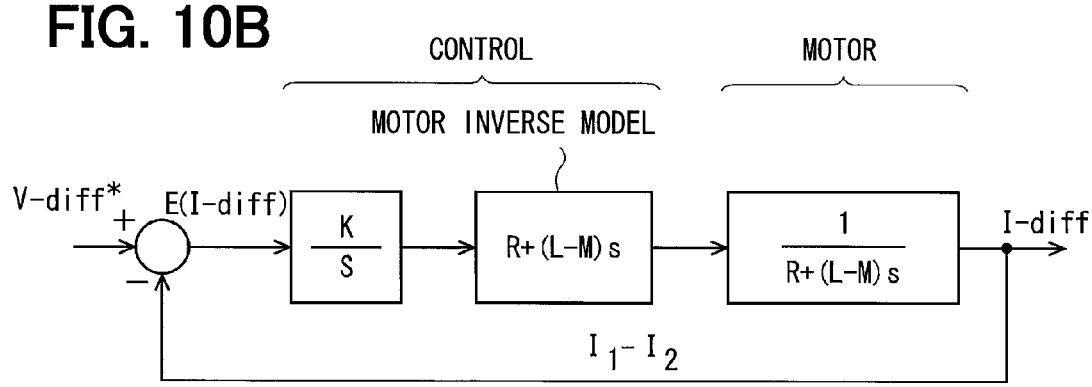
Figure 10C:
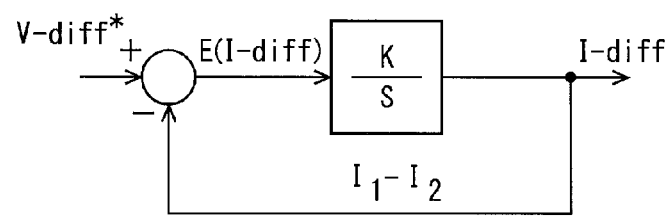

FIGS. 9A-9C are block diagrams of feedback control by means of the control of the current sum including the mutual inductance. FIGS. 10A-10C are block diagrams of feedback control by means of the control of the current difference including the mutual inductance. The controlled parameters Ki-sum and Kp-sum for the sum control are an integral gain and a proportional gain respectively. The controlled parameters Ki-difference and Kp-difference for the difference control are an integral gain and a proportional gain respectively. The integral and proportional gains can be expressed as Expressions 1.5-1.7 with a gain K.

$$Ki\text{-sum} = Ki\text{-difference} = K \times R \quad \text{(Ex. 1.5)}$$

$$Kp\text{-sum} = K \times (L+M) \quad \text{(Ex. 1.6)}$$

$$Kp\text{-difference} = K \times (L-M) \quad \text{(Ex. 1.7)}$$

The subtraction of Expression 1.7 from Expression 1.6 leads to Expression 1.8.

$$Kp\text{-sum} - Kp\text{-difference} = 2KM \quad \text{(Ex. 1.8)}$$

That is to say, the integral gains for the sum control and the difference control are set at an equal value, and each of the proportional gains for the sum control and the difference control is set at a value different from the other by 2K times the mutual inductance M.

The control terms in FIGS. 9A and 10A can be calculated by Expressions 1.9 and 1.10 respectively.

$$(Ki\text{-sum}/s) + Kp\text{-sum} = (K/s) \times \{R+(L+M)s\} \quad \text{(Ex. 1.9)}$$

$$(Ki\text{-difference}/s) + Kp\text{-difference} = (K/s) \times \{R+(L-M)s\} \quad \text{(Ex. 1.10)}$$

Therefore, FIGS. 9A and 10A can be rewritten as FIGS. 9B and 10B respectively. Each of the second control terms {R+(L+M)s} and {R+(L−M)s} in FIGS. 9B and 10B corresponds to an inverse model of the motor 80 and is offset by the associated motor term. Accordingly, as shown in FIGS. 9C and 10C, the constant of proportionality that is the product of the control and motor terms for each of the sum control and the difference control is K/s. This makes it possible to equalize the responsiveness for the sum control and the responsiveness for the difference control.

It will be explained below why the equal responsiveness for the sum control and the difference control makes it possible to restrict overcurrent in one of the first and second units if the other fails.

The voltage command values V1 and V2 for the first and second units respectively can be expressed as Expressions 1.11 and 1.12 based on Expressions 1.9 and 1.10.

$$\begin{aligned} V1 &= (V\text{-sum} + V\text{-difference})/2 \\ &= E(I\text{-sum}) \times (K/s) \times \{R+(L+M)s\}/2 + \\ &\quad E(I\text{-difference}) \times (K/s) \times \{R+(L-M)s\}/2 \\ &= (K/s) \times [\{I\text{-sum}^* - (I1+I2)\}/2 \times \{R+(L+M)s\} + \\ &\quad \{0 - (I1-I2)\}/2 \times \{R+(L-M)s\}] \\ &= (K/s) \times \\ &\quad \{(Ls+R+Ms) \times (I\text{-sum}^*/2) - (Ls+R)I1 - MsI2\} \\ &= (K/s) \times \\ &\quad [(Ls+R)\{(I\text{-sum}^*/2) - I1\} + Ms\{(I\text{-sum}^*/2) - I2\}] \end{aligned} \quad \text{(Ex. 1.11)}$$

$$\begin{aligned} V2 &= (V\text{-sum} - V\text{-difference})/2 \\ &= E(I\text{-sum}) \times (K/s) \times \{R+(L+M)s\}/2 - \\ &\quad E(I\text{-difference}) \times (K/s) \times \{R+(L-M)s\}/2 \\ &= (K/s) \times [\{I\text{-sum}^* - (I1+I2)\}/2 \times \{R+(L+M)s\} - \\ &\quad \{0 - (I1-I2)\}/2 \times \{R+(L-M)s\}] \\ &= (K/s) \times \\ &\quad \{(Ls+R+Ms) \times (I\text{-sum}^*/2) - (Ls+R)I2 - MsI1\} \\ &= (K/s) \times \\ &\quad [(Ls+R)\{(I\text{-sum}^*/2) - I2\} + Ms\{(I\text{-sum}^*/2) - I1\}] \end{aligned} \quad \text{(Ex. 1.12)}$$

The first term within the square brackets on the last line of each of Expressions 1.11 and 1.12 is based on the current I1 or I2 in the associated unit and equivalent to the feedback control for half of the sum of the current command values (I-sum*/2) in this unit. The second term, which includes the mutual inductance M, within the square brackets on the last line of each of Expressions 1.11 and 1.12 is decoupled by the balance between the voltages V1 and V2. Accordingly, if one of the two units fails and no current flows in it, the other unit (normal unit) is supplied with half of the sum of the current command values. This restricts overcurrent in the normal unit.

The foregoing description is for the dq-axis model as operating when the electrical angular velocity ω is 0. The following brief description is for the general dq-axis model as operating when the velocity ω is not 0.

The decomposition, into a d-axis component Vd and a q-axis component Vq, of the voltage vector V in the control of the sum of and the difference between the currents including the mutual inductance leads to Expressions 2.1-2.4, each of which includes an interference term between the d-axis and q-axis. In Expression 2.2, ψ denotes the armature flux linkage of the permanent magnets of the motor 80.

$$Vd\text{-sum} = R \times Id\text{-sum} + (L+M)s \times Id\text{-sum} - \omega(L+M)s \times Iq\text{-sum} \quad \text{(Ex. 2.1)}$$

$$Vq\text{-sum} = R \times Iq\text{-sum} + (L+M)s \times Iq\text{-sum} + \omega(L+M)s \times Id\text{-sum} + 2\omega\psi \quad \text{(Ex. 2.2)}$$

$$Vd\text{-difference} = R \times Id\text{-difference} + (L-M)s \times Id\text{-difference} - \omega(L-M)s \times Iq\text{-difference} \quad \text{(Ex. 2.3)}$$

$$Vq\text{-difference} = R \times Iq\text{-difference} + (L-M)s \times Iq\text{-difference} + \omega(L-M)s \times Id\text{-difference} \quad \text{(Ex. 2.4)}$$

Figure 11A:
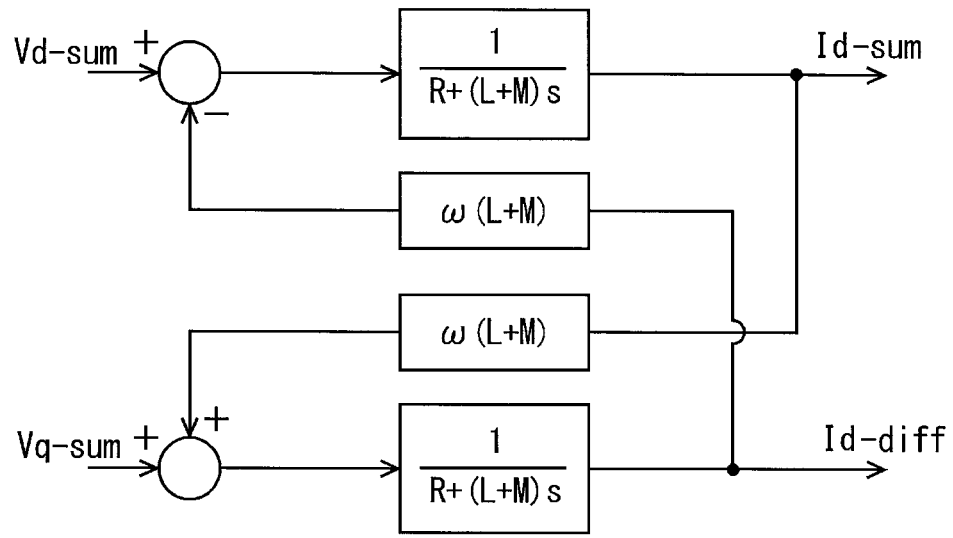
FIG. 11A is a block diagram for the explanation of a dq-axis model of current sum control including mutual inductance.
Figure 11B:
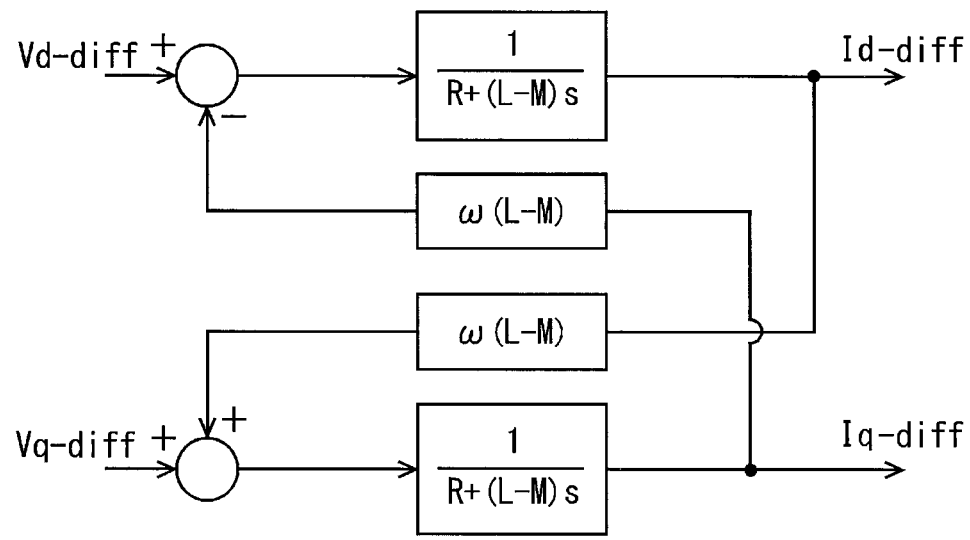
FIG. 11B is a block diagram for the explanation of a dq-axis model of current difference control including mutual inductance.
Figure 12:
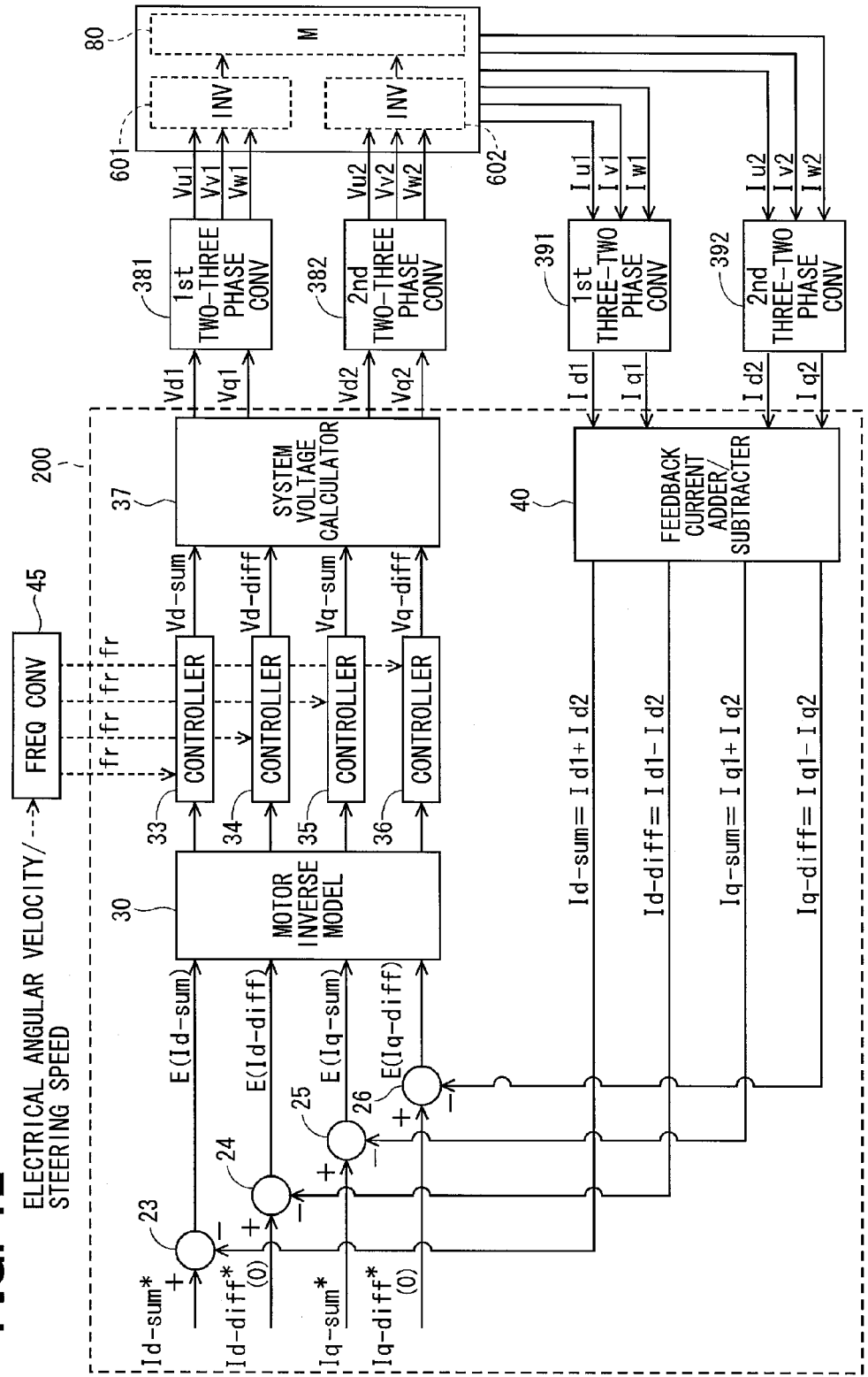
FIG. 12 is a block diagram of current sum control and current difference control drawn with the dq-axis models.

FIGS. 11A and 11B show Expressions 2.1-2.4 as block diagrams. FIG. 12 is a control block diagram for the current sum and the current difference by means of the dq-axis model. The block surrounded by broken lines in FIG. 12 corresponds to the current feedback computing section 200 in FIG. 4.

As shown in FIG. 12, the current feedback computing section 200 includes error calculators 23-26. The calculator 23 calculates the error E(Id-sum) between the current command value and sensed current value for the value Id-sum. The calculator 24 calculates the error E(Id-difference) between the current command value and sensed current value for the value Id-difference. The calculator 25 calculates the error E(Iq-sum) between the current command value and sensed current value for the value Iq-sum. The calculator 26 calculates the error E(Iq-difference) between the current command value and sensed current value for the value Iq-difference. An inverse model 30 of the motor 80 and the controllers 33-36 compute the values Vd-sum, Vd-difference, Vq-sum and Vq-difference, each of which is the sum of or the difference between the voltage command values, based on the errors E(Id-sum), E(Id-difference), E(Iq-sum) and E(Iq-difference) respectively.

The inverse model 30 and controllers 33-36 may compute Expressions 2.5-2.8.

$$Vd\text{-sum} = \{R \times E(Id\text{-sum}) + (L+M)s \times E(Id\text{-sum}) - \omega(L+M) \times E(Iq\text{-sum})\} \times (K/s) \quad \text{(Ex. 2.5)}$$

$$Vq\text{-sum} = \{R \times E(Iq\text{-sum}) + (L+M)s \times E(Iq\text{-sum}) + \omega(L+M) \times E(Id\text{-sum})\} \times (K/s) + 2\omega\phi \quad \text{(Ex. 2.6)}$$

$$Vd\text{-difference} = \{R \times E(Id\text{-difference}) + (L-M)s \times E(Id\text{-difference}) - \omega(L-M) \times E(Iq\text{-difference})\} \times (K/s) \quad \text{(Ex. 2.7)}$$

$$Vq\text{-difference} = \{R \times E(Iq\text{-difference}) + (L-M)s \times E(Iq\text{-difference}) + \omega(L-M) \times E(Id\text{-difference})\} \times (K/s) \quad \text{(Ex. 2.8)}$$

Alternatively, the inverse model 30 and controllers 33-36 may compute Expressions 2.9-2.12.

$$Vd\text{-sum} = \{R \times E(Id\text{-sum}) + (L+M)s \times E(Id\text{-sum})\} \times (K/s) - \omega(L+M) \times (Id\text{-sum}) \quad \text{(Ex. 2.9)}$$

$$Vq\text{-sum} = \{R \times E(Iq\text{-sum}) + (L+M)s \times E(Iq\text{-sum})\} \times (K/s) + \omega(L+M) \times (Iq\text{-sum}) + 2\omega\phi \quad \text{(Ex. 2.10)}$$

$$Vd\text{-difference} = \{R \times E(Id\text{-difference}) + (L-M)s \times E(Id\text{-difference})\} \times (K/s) - \omega(L-M) \times (Id\text{-difference}) \quad \text{(Ex. 2.11)}$$

$$Vq\text{-difference} = \{R \times E(Iq\text{-difference}) + (L-M)s \times E(Iq\text{-difference})\} \times (K/s) + \omega(L-M) \times (Iq\text{-difference}) \quad \text{(Ex. 2.12)}$$

A unit voltage calculator 37 converts the values Vd-sum, Vd-difference, Vq-sum and Vq-difference into voltage command values Vd1 and Vq1 for the first unit and voltage command values Vd2 and Vq2 for the second unit. The two-three phase converters 381 and 382 and three-two phase converters 391 and 392 operate as explained with reference to FIG. 4. As stated already, the first three-two phase converter 391 outputs the sensed current values Id1 and Iq1, and the second three-two phase converter 392 outputs the sensed current values Id2 and Iq2. A current adder/subtracter 40 converts the current values Id1, Iq1, Id2, and Iq2 into the values Id-sum, Id-difference, Iq-sum and Iq-difference.

Figure 6:
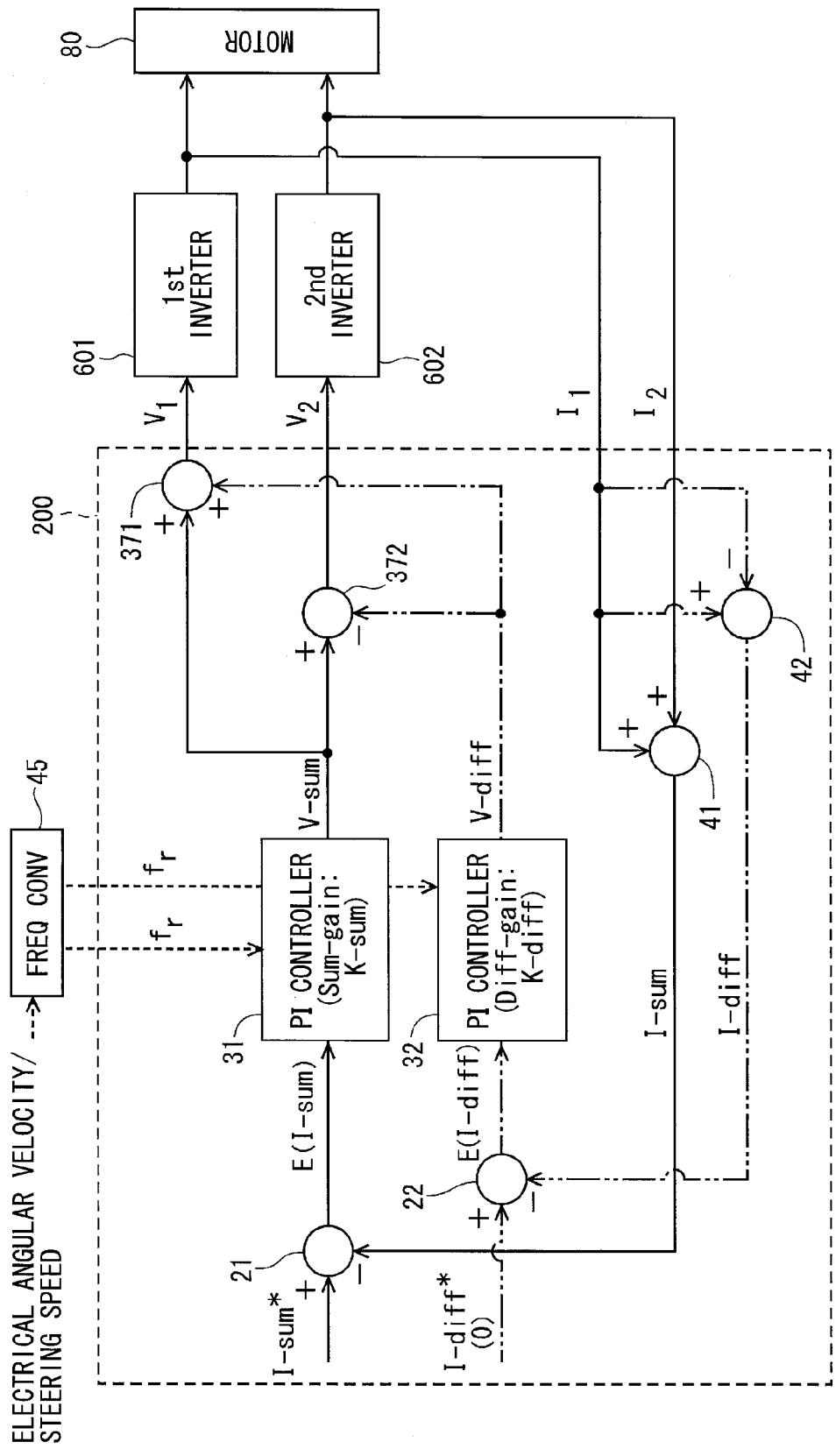
FIG. 6 is a block diagram for the explanation of current sum control and current difference control according to the first embodiment.

As stated with reference to FIG. 6, the frequency converter 45 converts the electrical angular velocity of the motor 80 or the steering speed of the steering shaft 92 into the reference frequency fr. The converter 45 then outputs the frequency fr to the controllers 33-36.

In the dq-axis model, based on Expressions 2.1-2.12, it is possible to make developments corresponding to Expressions 1.5-1.12 for this model as operating when the electrical angular velocity ω is 0. However, details of the developments are omitted.

In conclusion, each of the d-axis and q-axis voltage command values for the first and second units includes an interference term between the units and an interference term between the d-axis and q-axis. Therefore, it is possible to decouple the units from each other, and also decouple the d-axis and q-axis from each other, by making the integral gains for the units equal to each other, and also making the proportional gains for the units different from each other by 2K times the mutual inductance M.

The decoupling is equivalent to the feedback control of the currents in each of the first and second units with half (I-sum*/2) of the sum of the current command values. This restricts overcurrent in one of the units if no current can flow in the other.

The d-axes and q-axes in the first and second units interfere with each other. However, in the configuration for the control of the current sum and current difference, the d-axis and q-axis for the sum control interfere with the d-axis and q-axis for the difference control. This simplifies the control configuration.

Thus, the accurate description of the current control in the ECU 10 is complicated because the description involves studying the control by means of the dq-axis model including the mutual inductance. However, the primary feature of the current control by the ECU 10 is to control the current sum and the current difference for each of the inverters 601 and 602. This is shown intensively in the control block diagram of FIG. 6. Therefore, the following description will be provided by means of expressions that do not use the concept of a dq-axis vector, as shown in FIG. 6.

[Current Phase Difference between 2 Units and Current Strain During High Speed Rotation]

The second feature of the current control in the ECU 10 is the phase shift by the electrical angle of 30° between the alternating currents output in each phase from the inverters 601 and 602, as explained with reference to FIG. 3. The shift makes it possible to cancel the sixth strain component created when a fundamental current wave on which the fifth higher harmonic is superimposed is dq-converted. The reason for that will be explained below with reference to FIGS. 13 and 14A.

Figure 13:
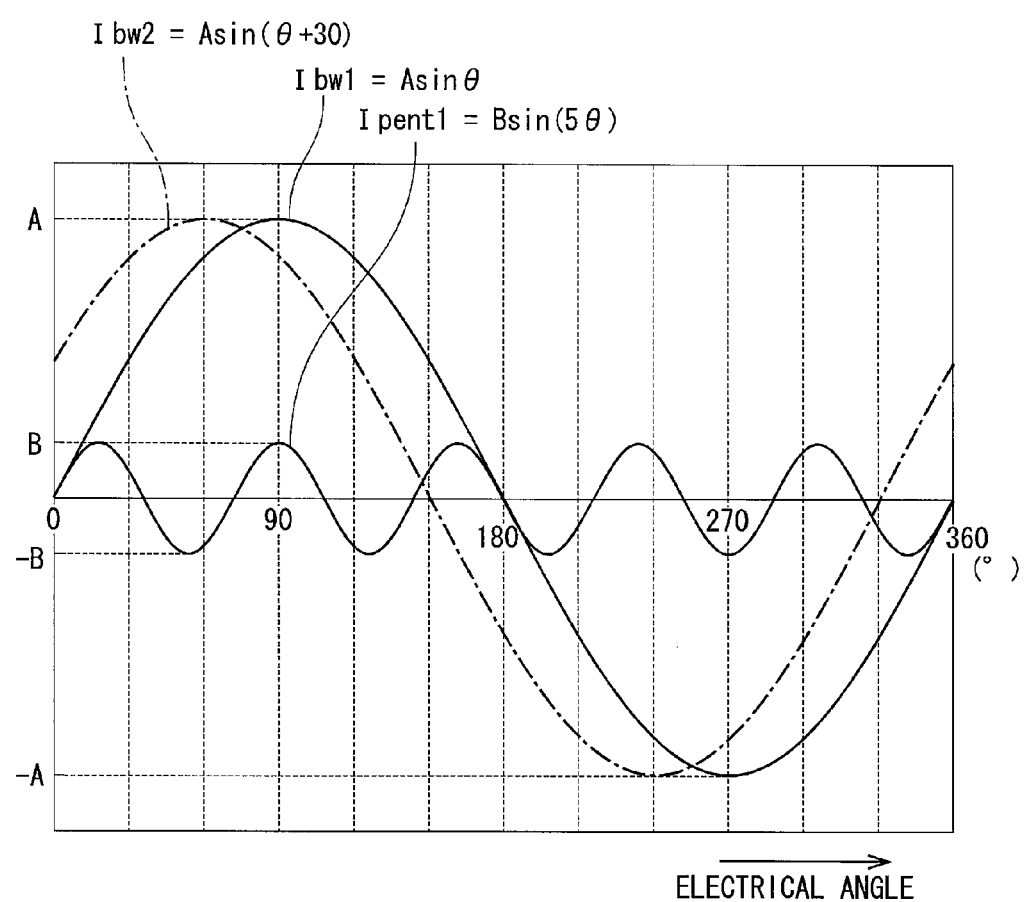
FIG. 13 is a diagram showing fundamental current waves and a fifth higher harmonic.

FIG. 13 shows the fundamental waves Ibw1 and Ibw2, which are the primary components, of the currents in the first and second units respectively and the fifth higher harmonic Ipent1 associated with the wave Ibw1. The waves Ibw1 and Ibw2 have an amplitude A. The harmonic Ipent1 has an amplitude B. For the sake of simplicity, the fifth higher harmonic Ipent2 associated with the wave Ibw2 is not shown. The waves Ibw1 and Ibw2 can be expressed as Expressions 3.1 and 3.2 respectively.

$$Ibw1 = A \sin \theta \quad \text{(Ex. 3.1)}$$

$$Ibw2 = A \sin(\theta + 30) \quad \text{(Ex. 3.2)}$$

The superimposition of the fifth higher harmonic Ipent1 on the fundamental wave Ibw1 in the first unit makes a superimposed wave. If the superimposed wave is dq-converted, its primary component is converted into a DC component A', and its fifth component becomes its sixth strain component Ihex1, as shown by Expressions 3.3 and 3.4.

$$A \sin \theta + B \sin(5\theta) - \langle dq\text{-conversion} \rangle \rightarrow A' + B' \sin(6\theta) \quad \text{(Ex. 3.3)}$$

$$Ihex1 = B' \sin(6\theta) \quad \text{(Ex. 3.4)}$$

Likewise, the superimposition of the fifth higher harmonic Ipent2 on the fundamental wave Ibw2 in the second unit makes a superimposed wave. If this superimposed wave is dq-converted, its primary component is converted into a DC component A', and its fifth component becomes its sixth strain component Ihex2, as shown by Expressions 3.5 and 3.6.

$$A \sin(\theta+30)+B \sin \{5\times(\theta+30)\}\text{-}\langle dq\text{-conversion}\rangle\rightarrow A'+B' \sin \{6\times(\theta+30)\}=A'+B' \sin(6\theta+180)=A'-B' \sin(6\theta) \quad \text{(Ex. 3.5)}$$

$$Ihex2=-B' \sin(6\theta)=-Ihex1 \quad \text{(Ex. 3.6)}$$

Figure 14A:
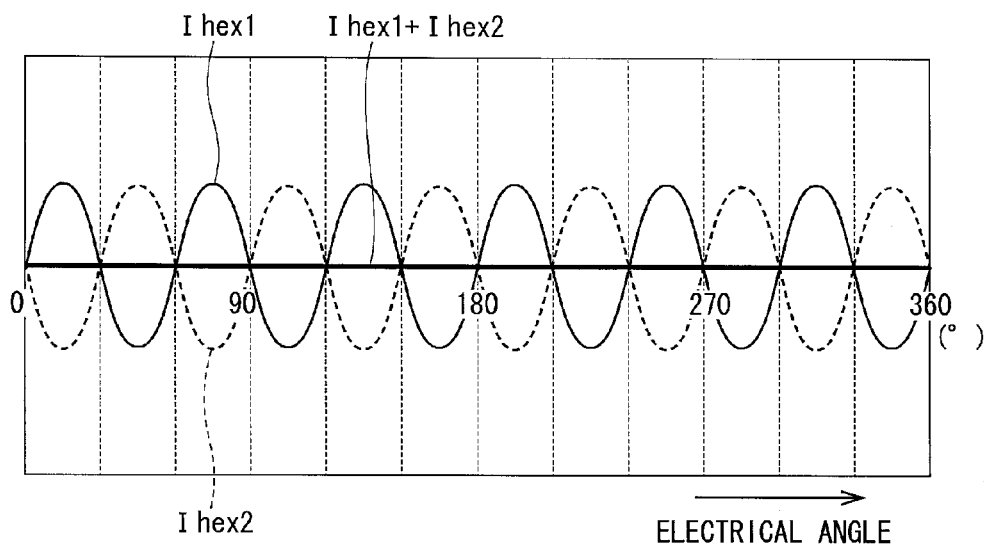
FIG. 14A is a block diagram for the explanation of the current strain caused while the three-phase rotating machine is rotating at a high speed during current sum control.

Accordingly, as shown in FIG. 14A, in the control that includes computing the sum of the dq-converted currents in the first and second units, the sixth components of the currents are opposite in phase to each other and offset each other.

Figure 14B:
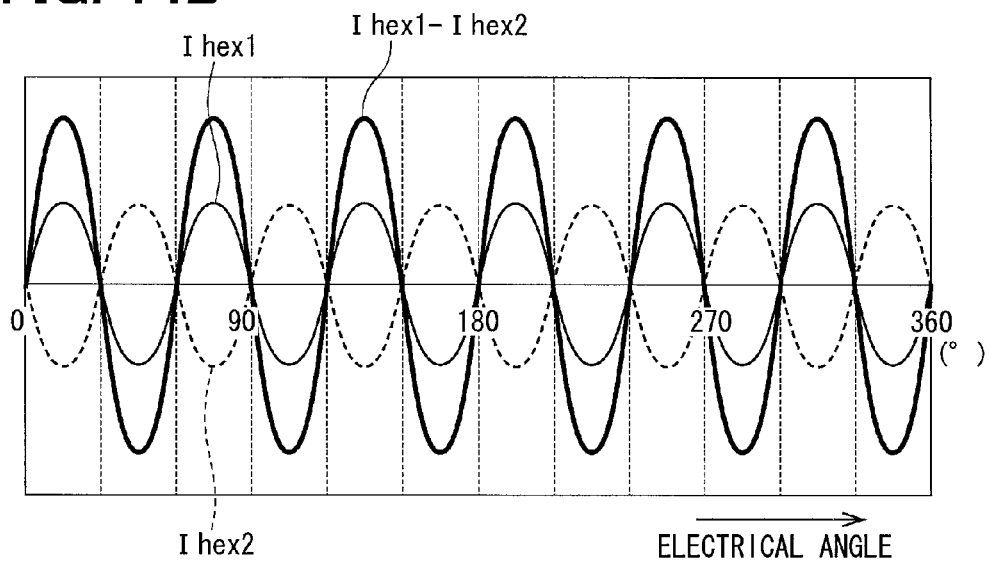
FIG. 14B is a block diagram for the explanation of the current strain caused while the three-phase rotating machine is rotating at a high speed during current difference control.

As shown in FIG. 14B, in the control that includes computing the difference between the dq-converted currents in the first and second units, the sixth components of the currents are the same in phase. Accordingly, in this case, if the induced voltage rises while the motor 80 is rotating at a high speed, the current strain increases and may cause sounds and/or vibrations.

Figure 15:
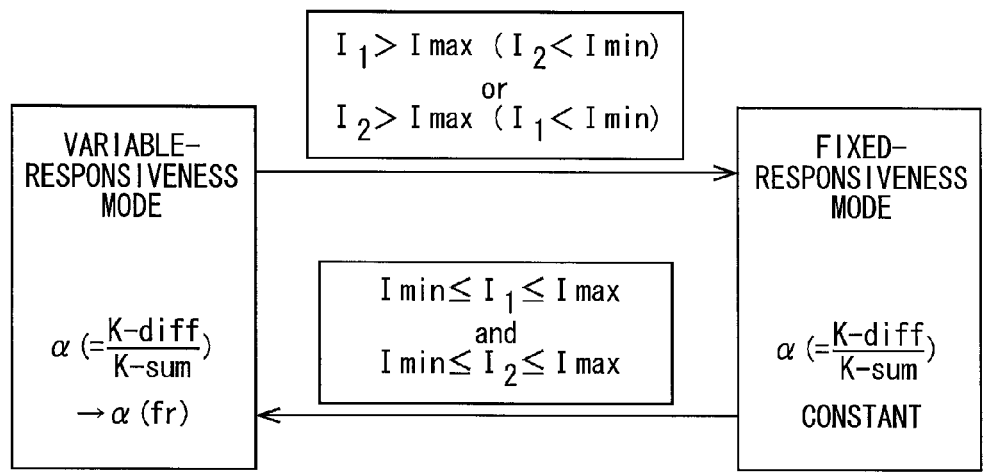
FIG. 15 is a diagram for the explanation of the transition between a variable-responsiveness mode and a fixed-responsiveness mode according to the first embodiment.

The third feature of the current control in the ECU 10 is to vary the responsiveness in the sum and difference control according to the reference frequency fr corresponding to the speed of the motor 80. Specifically, as shown in FIG. 15, the difference/sum gain ratio α is varied. The difference/sum gain ratio α is the ratio (K-difference/K-sum) of the difference gain K-difference in the difference control to the sum gain K-sum in the sum control. The mode in which the ECU 10 performs this control will be referred to as "the variable-responsiveness mode". In particular, the difference/sum gain ratio α is varied by the current feedback computing section 200.

As stated already, the frequency converter 45 may convert either the electrical angular velocity of the motor 80 or the steering speed of the steering shaft 92 into the reference frequency fr.

The object of the control in the variable-responsiveness mode is to reduce the strain while the motor 80 is rotating at a high speed. However, this control does not make it possible to fix at the optimum value the difference/sum gain ratio α for restricting overcurrent in one of the first and second units if the other fails and no current flows in it. As a result, while the motor 80 is rotating at a high speed, the variation of the difference/sum gain ratio α may cause the output current from one of the units to exceed the upper limit value of the normal range if the other unit fails.

On the presumption that one of the first and second units has failed if the current output from the other exceeds the upper limit value of the normal range, priority is given to the use of the difference/sum gain ratio optimum for the overcurrent restriction for the other unit. Therefore, in this case, the ECU 10 fixes the responsiveness in the sum and difference control regardless of the reference frequency. Specifically, the ECU 10 makes the difference/sum gain ratio α constant. The mode in which the ECU 10 performs this control will be referred to as "the fixed-responsiveness mode".

Thus, the fourth feature of the current control in the ECU 10 is to switch between the variable-responsiveness mode and the fixed-responsiveness mode depending on circumstances.

The switching between the variable-responsiveness and fixed-responsiveness modes will be explained below with reference to FIG. 15. The upper and lower limit values of the normal ranges of the currents output from the first and second units are denoted by Imax and Imin respectively. The current values under the lower limit value Imin are considered substantially zero.

If the first inverter 601 is normal and the second inverter 602 fails, the current output from the abnormal inverter 602 is less than the lower limit value Imin. As a result, if the current output from the normal inverter 601 exceeds the upper limit value Imax, the ECU 10 switches from the variable-responsiveness mode to the fixed-responsiveness mode. In this case, the difference/sum gain ratio α in the fixed-responsiveness mode is set at a value that restricts the current from the first unit from exceeding the upper limit value Imax over the whole of the practical reference frequency range.

During the control in the fixed-responsiveness mode, if the abnormal inverter is restored to its normal condition and the current output from this inverter is within the normal range between the limit values Imax and Imin, the ECU 10 switches from the fixed-responsiveness mode to the variable-responsiveness mode.

Thus, the ECU 10 performs the control basically in the variable-responsiveness mode if both inverters 601 and 602 are normal, and the ECU performs the control in the fixed-responsiveness mode if the current from one of the inverters is abnormal.

The fifth feature of the current control in the ECU 10 is to fix the gain K-sum for the sum control and vary the gain K-difference for the difference control when the ECU varies the difference/sum gain ratio α (=K-difference/K-sum) in the variable-responsiveness mode.

Figure 16:
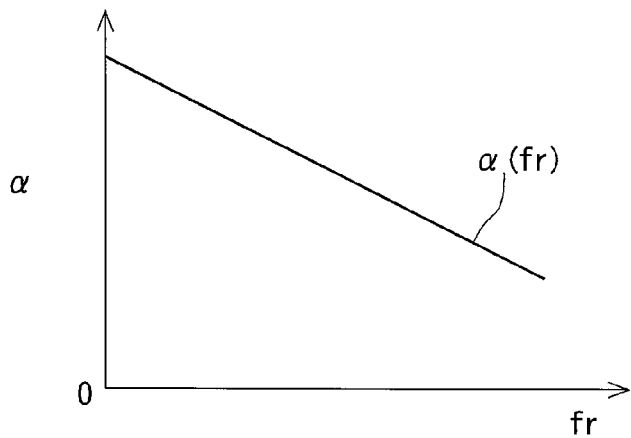
FIG. 16 is a diagram illustrating the relationship between a reference frequency and a difference/sum gain ratio according to the first embodiment.

The relationship between the reference frequency fr and difference/sum gain ratio α in the variable-responsiveness mode will be explained below with reference to FIG. 16. As shown in FIG. 16, the ratio α varies with the frequency fr over the whole range of the reference frequency fr. In other words, the ratio α can be expressed as a function α(fr) of the reference frequency fr.

In a low-speed rotation range where the reference frequency fr is lower, the influence of the strain component of the induced voltage of the motor 80 is less, so that the difference/sum gain ratio α can be set at a relatively high value.

In a high-speed rotation range where the reference frequency fr is higher, the influence of the strain component of the induced voltage of the motor 80 is remarkable. Accordingly, it is possible to suitably suppress the influence by making the difference/sum gain ratio α lower as the reference frequency fr rises.

Advantages of the ECU 10 will be explained below.

(1) The ECU 10 performs the current sum control and the current difference control for the inverters 601 and 602 of the first and second units. It is possible to suppress the torque ripples in the motor 80 and improve the heat characteristic of the motor by converging the current difference between the two units into 0. By suitably setting the sum gain K-sum and the difference gain K-difference, as stated already, it is possible to restrict overcurrent in one of the two units if the other fails, so that no current flows in it.

(2) If a superimposed wave consisting of a fundamental wave and the fifth higher harmonic superimposed on the fundamental wave is dq-converted, the fifth component becomes the sixth strain component. In contrast, the phase shift of 30° between the alternating currents in the first and second units cancels the sixth strain component in electrical angle in the control of the current sum.

(3) In the control of the sum of and the difference between the currents in the first and second units, if the induced voltage increases while the motor 80 is rotating at a high speed, the current strain increases. The strain may cause sounds and/or vibrations while the motor 80 is rotating at a high speed. Therefore, by so varying the difference/sum gain ratio α as to make the PI controllers 31 and 32 different in responsiveness from each other according to the reference frequency fr, which is proportional to the speed of the motor 80, it is possible to suppress the influence of the current strain, thereby reducing the sounds and/or vibrations while the motor is rotating at a high speed.

(4) By switching between the variable-responsiveness and fixed-responsiveness modes according to the currents from the first and second units, it is possible to more suitably restrict overcurrent in the inverter of one of the units if the inverter of the other fails.

(5) If the sum gain K-sum is varied when the difference/sum gain ratio α (K-difference/K-sum) is varied in the variable-responsiveness mode, the output from the inverters 601 and 602 may delay relative to the current command value I*. It is possible to stabilize the output from the inverters by fixing the sum gain K-sum and varying the difference gain K-difference.

Other embodiments about the relationship between the reference frequency fr and difference/sum gain ratio α in the variable-responsiveness mode will be described below with reference to FIGS. 17 and 18.

Second Embodiment

Figure 17:
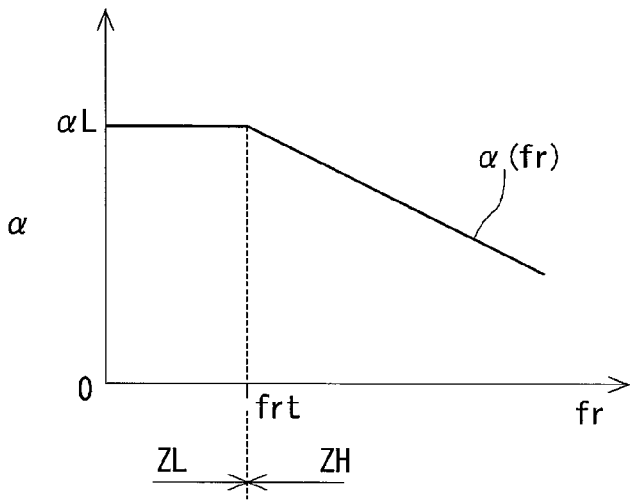
FIG. 17 is a diagram illustrating the relationship between a reference frequency and a difference/sum gain ratio according to a second embodiment of the present disclosure.

In the second embodiment shown in FIG. 17, the difference/sum gain ratio α is a constant value αL in the low frequency range ZL where the reference frequency fr is lower than a threshold frt, and the ratio α varies with the reference frequency fr in the high frequency range ZH where the reference frequency fr is equal to or higher than the threshold frt. The reference frequency threshold frt is equivalent to the frequency at which the strain component of the induced voltage of the motor 80 is equal to or greater than a predetermined value in the high frequency range ZH.

In the low frequency range ZL, where the motor 80 rotates at a relatively low speed, the strain component of the induced voltage is at a level of magnitude where it causes no problem. Therefore, it is desirable to fix the difference/sum gain ratio α at the optimum value for restricting overcurrent in one of the first and second units if the other fails.

In the high frequency range ZH, where the motor 80 rotates at a relatively high speed, where the reference frequency fr is equal to or higher than the threshold frt, the strain component of the induced voltage may cause a problem. Therefore, the ECU 10 lowers the difference/sum gain ratio α as the reference frequency fr rises, as is the case with the first embodiment.

Third Embodiment

Figure 18:
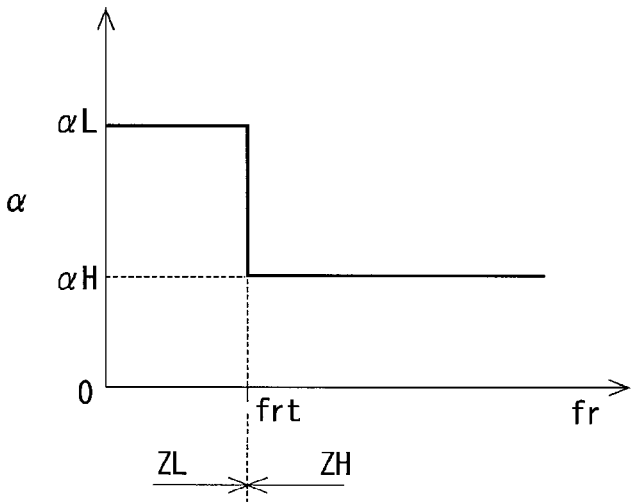
FIG. 18 is a diagram illustrating the relationship between a reference frequency and a difference/sum gain ratio according to a third embodiment of the present disclosure.

In the third embodiment shown in FIG. 18, the difference/sum gain ratio α is the constant value αL in the low frequency range ZL, where the reference frequency fr is lower than the threshold frt, and the difference/sum gain ratio α is a constant value αH, which is lower than the value αL, in the high frequency range ZH, where the reference frequency fr is equal to or higher than the threshold frt.

The ECU 10 uses the difference/sum gain ratio aH adaptable to the practically assumed highest frequency fr uniformly over the whole of the high frequency range ZH, where the motor 80 rotates at a relatively high speed, and where it is necessary to suppress the influence of the strain component. Accordingly, the relationship between the reference frequency fr and the difference/sum gain ratio α is shown in the form of two stages. This makes it simple to set the ratio α.

In a modification (not shown) of the third embodiment, the high frequency range ZH, where the reference frequency fr is equal to or higher than the threshold frt, is divided into sections in each of which the difference/sum gain ratio α is a constant value. In other words, the relationship between the reference frequency fr and the ratio α in the modification consists of three or more stages.

Other Embodiments (A) In the motor 80 shown in FIGS. 3A-3C, the second winding set 802 is ahead in phase of the first winding set 801 by the angle equivalent to the electrical angle of 30°(+30° in phase). Alternatively, the phase of the second winding set 802 might be behind the phase of the first winding set 801 by the angle equivalent to the electrical angle of 30°(−30° in phase). The U-phase of the second winding set 802 might be ±90° or ±150°(±120°±30°) relative to the V-phase or W-phase (±120° relative to the U-phase) of the first winding set 801.

In summary, it is essential that the phase currents supplied to the winding sets 801 and 802 differ in phase by (30±60×n)°, n being an integer.

(B) In each of the above embodiments, the malfunction determining section 751 and 752 determine whether the sensed phase current values Iu, Iv and Iw are within the normal range. Alternatively, the determining section 751 and 752 might determine whether the dq-converted current values Id and Iq are within a normal range.

(C) Details of the structure of the ECU 10 are not limited to the structure of the above embodiments. For example, the switching elements might be field-effect transistors other than MOSFETs, or be IGBTs.

(D) The three-phase rotating machine control device according to the present disclosure may be applied as not only a control device for a motor for an electric steering apparatus but also a control device for another three-phase motor or a three-phase generator.

Summarizing the above, the control device 10 is for a three-phase rotating machine 80 having a first three-phase winding set 801 and a second three-phase winding set 802, the first and second three-phase winding sets 801 and 802 being coupled magnetically to each other. The control device 10 includes a first power converter 601, a second power converter 602, a first current sensing section 701, a second current sensing section 702, and a current feedback computing section 200. The first power converter 601 outputs a first alternating current to the first three-phase winding set 801. The second power converter 602 outputs a second alternating current to the second three-phase winding set 802. The first and second alternating currents are different in phase by an angle of 30°±60°×n from each other, in which the n is an integer. The first current sensing section 701 senses the first alternating current and outputs a first sensed current value I1. The second current sensing section 702 senses the second alternating current and outputs a second sensed current value I2. The current feedback computing section 200 includes a current sum controller 31 and a current difference controller 32. The current sum controller 31 multiplies a sum error E(I-sum) by a sum gain K-sum, and computes a sum V-sum of a first voltage command value V1 for the first power converter 601 and a second voltage command value V2 for the second power converter 602. The sum error E(I-sum) is an error between a sum I-sum of the first sensed current value I1 and the second sensed current value I2 and a sum I-sum* of a first current command value for the first alternating current and a second current command value for the second alternating current. The current difference controller 32 multiplies a difference error E(I-difference) by a difference gain K-difference, and computes a difference V-difference between the first voltage command value V1 and the second voltage command value V2. The difference error E(I-difference) is an error between a difference I-difference between the first sensed current value I1 and the second sensed current value I2 and a difference I-difference* between the first current command value and the second current command value. The current feedback computing section 200 performs a feedback control in a variable-responsiveness mode in which the current sum controller 31 and the current difference controller 32 are different in responsiveness. In the variable-responsiveness mode, the current feedback computing section 200 varies a gain ratio α between the sum gain and the difference gain according to a reference frequency fr corresponding to a frequency of the first and second alternating currents. In this control device, the advantageous effects described above will be achieved.

For example, the current sum controller 31 may compute the sum V-sum of the first voltage command value V1 and the second voltage command value V2 based on an inverse model of the three-phase rotating machine 80, the inverse model including a magnetic coupling of the first three-phase winding set 801 and the second three-phase winding set 802. The current difference controller 32 may compute the difference V-difference between the first voltage command value V1 and the second voltage command value V2 based on the inverse model.

For example, the control device 10 may include a first malfunction determining section 751 determining whether the first sensed current value I1 is within a normal range, and a second malfunction determining section 752 determining whether the second sensed current value I2 is within the normal range. When one of the first alternating current I1 and the second alternating current I2 exceeds an upper limit value of the normal range, the current feedback computing section 200 performs the feedback control in a fixed-responsiveness mode. In the fixed-responsiveness mode, the current feedback computing section 200 sets the gain ratio α to a constant value regardless of the reference frequency fr.

For example, when the first alternating current I1 and the second alternating current I2 are within the normal range in the fixed-responsiveness mode, the current feedback computing section 200 may switch from the fixed-responsiveness mode to the variable-responsiveness mode.

For example, in the variable-responsiveness mode, the current feedback computing section 200 may set the gain ratio α to a constant value in a frequency range where a strain component of an induced voltage of the three-phase rotating machine 80 is smaller than a predetermined value.

For example, the current feedback computing section 200 may vary the gain ratio α by fixing the sum gain and varying the difference gain.

For example, the control device 10 may include a frequency calculating section 45 that calculates the reference frequency fr by converting an electrical angular velocity of the three-phase rotating machine, and provides the reference frequency fr to the current feedback computing section 200. For example, the three-phase rotating machine 80 may be used as a steering assist motor for generating steering assist torque in an electric steering apparatus 1 of a vehicle. The control device 10 may include a frequency calculating section 45 that calculates the reference frequency fr by converting a steering speed of a steering shaft 92 of the vehicle, and provides the reference frequency to the current feedback computing section 200.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A control device for a three-phase rotating machine having a first three-phase winding set and a second three-phase winding set, the first and second three-phase winding sets being coupled magnetically to each other, the control device comprising:
    a first power converter outputting a first alternating current to the first three-phase winding set;
    a second power converter outputting a second alternating current to the second three-phase winding set, the first and second alternating currents differing in phase by an angle of 30±60°×n from each other, the n being an integer;
    a first current sensing section sensing the first alternating current and outputting a first sensed current value;
    a second current sensing section sensing the second alternating current and outputting a second sensed current value; and
    a current feedback computing section including a current sum controller and a current difference controller, wherein
    the current sum controller multiplies a sum error by a sum gain and computes a sum of a first voltage command value for the first power converter and a second voltage command value for the second power converter, the sum error being an error between a sum of the first sensed current value and the second sensed current value and a sum of a first current command value for the first alternating current and a second current command value for the second alternating current,
    the current difference controller multiplies a difference error by a difference gain and computes a difference between the first voltage command value and the second voltage command value, the difference error being an error between a difference between the first sensed current value and the second sensed current value and a difference between the first current command value and the second current command value,
    the current feedback computing section performs a feedback control in a variable-responsiveness mode in which the current sum controller and the current difference controller are difference in responsiveness, and
    in the variable-responsiveness mode, the current feedback computing section varies a gain ratio between the sum gain and the difference gain according to a reference frequency corresponding to a frequency of the first and second alternating currents.

2. The control device according to claim 1, wherein
    the current sum controller computes the sum of the first voltage command value and the second voltage command value based on an inverse model of the three-phase rotating machine, the model including a magnetic coupling of the first three-phase winding set and the second three-phase winding set, and
    the current difference controller computes the difference between the first voltage command value and the second voltage command value based on the inverse model.

3. The control device according to claim 1, further comprising:
    a first malfunction determining section determining whether the first sensed current value is within a normal range; and a second malfunction determining section determining whether the second sensed current value is within the normal range, wherein, when one of the first sensed current value and the second sensed current value exceeds an upper limit value of the normal range, the current feedback computing section performs the feedback control in a fixed-responsiveness mode, and in the fixed-responsiveness mode, the current feedback computing section sets the gain ratio to a constant value regardless of the reference frequency.

4. The control device according to claim 1, wherein in the variable-responsiveness mode, the current feedback computing section sets the gain ratio to a constant value in a frequency range where a strain component of an induced voltage of the three-phase rotating machine is smaller than a predetermined value.

5. The control device according to claim 1, wherein the current feedback computing section varies the gain ratio by fixing the sum gain and varying the difference gain.

6. The control device according to claim 1, further comprising:

a frequency calculating section that calculates the reference frequency by converting an electrical angular velocity of the three-phase rotating machine, and provides the reference frequency to the current feedback computing section.

7. The control device according to claim 1, wherein the three-phase rotating machine is used as a steering assist motor for generating steering assist torque in an electric steering apparatus of a vehicle, the control device further comprising:

a frequency calculating section that calculates the reference frequency by converting a steering speed of a steering shaft of the vehicle, and provides the reference frequency to the current feedback computing section.

8. The control device according to claim 3, wherein when the first sensed current value and the second current value are within the normal range in the fixed-responsiveness mode, the current feedback computing section switches from the fixed-responsiveness mode to the variable-responsiveness mode.

* * * * *